United States Patent
Maghsoodi et al.

(10) Patent No.: US 10,961,090 B2
(45) Date of Patent: Mar. 30, 2021

(54) RESCUE HOIST COOLING SYSTEM

(71) Applicant: GOODRICH CORPORATION, Charlotte, NC (US)

(72) Inventors: Bejan Maghsoodi, San Dimas, CA (US); Yasuhide Kitaoka, Hacienda Heights, CA (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 16/532,369

(22) Filed: Aug. 5, 2019

(65) Prior Publication Data
US 2021/0039927 A1  Feb. 11, 2021

(51) Int. Cl.
| B66D 3/22 | (2006.01) |
| B66D 3/26 | (2006.01) |
| B66D 5/02 | (2006.01) |
| B66D 1/30 | (2006.01) |

(52) U.S. Cl.
CPC .............. *B66D 3/22* (2013.01); *B66D 1/30* (2013.01); *B66D 3/26* (2013.01); *B66D 5/023* (2013.01); *B66D 2700/0183* (2013.01)

(58) Field of Classification Search
CPC ... B66D 1/30; B66D 3/22; B66D 3/26; B66D 5/023; B66D 2700/0183; H02K 9/14; H02K 9/06
See application file for complete search history.

(56) References Cited

U.S. PATENT DOCUMENTS

| 2,615,941 | A | | 10/1952 | Schrock | |
|---|---|---|---|---|---|
| 2,783,398 | A | * | 2/1957 | Haas | H02K 9/14 310/57 |
| 3,748,507 | A | * | 7/1973 | Sieber | H02K 9/14 310/58 |
| 4,096,404 | A | * | 6/1978 | Sukhanov | H02K 7/1012 310/67 R |
| 5,081,384 | A | * | 1/1992 | Rausch | H02K 5/10 310/63 |
| 5,249,777 | A | * | 10/1993 | Herving | A01K 73/06 254/289 |
| 5,780,946 | A | * | 7/1998 | Nakamura | F04D 25/082 310/58 |
| 6,078,115 | A | * | 6/2000 | Uchida | B23Q 5/10 310/58 |

(Continued)

FOREIGN PATENT DOCUMENTS

| CN | 204549917 | 8/2015 |
| EP | 2800251 | 11/2014 |

(Continued)

OTHER PUBLICATIONS

European Patent Office, European Search Report dated Jun. 26, 2020 in Application No. 19215167.8.

*Primary Examiner* — Michael E Gallion
(74) *Attorney, Agent, or Firm* — Snell & Wilmer LLP

(57) ABSTRACT

A hoist, in accordance with various embodiments, is disclosed herein. The hoist comprises a cooling apparatus coupled to a motor and disposed within a torque tube. The cooling apparatus may operate with the hoist or independently of the hoist. The cooling apparatus may pull air external to a housing of the hoist through the torque tube and cool the motor and/or a controller of the hoist.

18 Claims, 7 Drawing Sheets

(56) References Cited

U.S. PATENT DOCUMENTS

| | | | | |
|---|---|---|---|---|
| 6,241,215 | B1* | 6/2001 | Gersemsky | A61G 7/1042 |
| | | | | 254/342 |
| 7,308,950 | B2* | 12/2007 | Faatz | B25F 5/008 |
| | | | | 173/170 |
| 7,907,045 | B2 | 3/2011 | Ishikawa et al. | |
| 9,181,071 | B2* | 11/2015 | Hagihara | B66D 3/26 |
| 10,439,475 | B2* | 10/2019 | Madsen Obel | H02K 9/06 |
| 10,790,726 | B2* | 9/2020 | Diemunsch | H02K 9/06 |
| 2006/0179985 | A1* | 8/2006 | Bohne | B24B 55/102 |
| | | | | 83/78 |
| 2007/0273220 | A1* | 11/2007 | Koyama | H02K 9/06 |
| | | | | 310/58 |
| 2008/0116432 | A1* | 5/2008 | Folk | E21B 19/008 |
| | | | | 254/362 |
| 2009/0309082 | A1* | 12/2009 | Webb | B66D 1/12 |
| | | | | 254/340 |
| 2017/0005547 | A1* | 1/2017 | Chou | H02K 9/28 |

FOREIGN PATENT DOCUMENTS

| | | |
|---|---|---|
| EP | 3429069 | 1/2019 |
| GB | 987623 | 3/1965 |

* cited by examiner

RESCUE HOIST COOLING SYSTEM

FIELD

The present disclosure relates generally to hoists and, more particularly, to overload clutch assemblies for hoists.

BACKGROUND

Hoists are devices used to mechanically lift and/or lower loads (e.g., cargo, persons, etc.). Hoists may include a motor-driven cable drum around which a cable winds and/or unwinds. The hoist applies a pulling force to the load through the cable in order to control and/or move the load from one physical location to another physical location. Hoists are used in many environments, including aircraft, automobile, and truck applications, as well as anchor systems, cable cars, cranes, and the like. Hoists electronic controller and electric motor components utilize active air cooling during operation, to prevent overheating.

SUMMARY

A hoist, in accordance with various embodiments, is disclosed herein. The hoist comprises: a housing; a torque tube disposed within the housing, the torque tube having a plurality of radial apertures; a motor disposed within the torque tube, the motor having a shaft defining a longitudinal axis; a controller coupled to the motor and the housing proximate a housing adjacent surface of the controller; and a cooling apparatus coupled to the motor proximate the plurality of radial apertures of the torque tube.

In various embodiments, the cooling apparatus may comprise a mounting portion coupled to the shaft of the motor. The cooling apparatus may further comprise a first end defining an inlet and a second end disposed opposite the first end. The cooling apparatus may further comprise a plurality of blades disposed between the first end and the second end. The controller may comprise a plurality of fins disposed on the housing adjacent surface. The cooling apparatus may be an impeller. The cooling apparatus may be a direct current (DC) electrical fan. The cooling apparatus may rotate as the shaft of the motor rotates.

A hoist, in accordance with various embodiments, is disclosed herein. The hoist comprises: a housing having a first end partially defining a housing surface; a torque tube disposed within the housing, the torque tube having a torque tube inner surface; a motor disposed within the torque tube, the motor having a motor outer surface, the torque tube inner surface and the motor outer surface defining an axial channel; a controller having a controller surface, the controller coupled to the motor and the housing proximate the housing surface, the housing surface and the controller surface defining a radial channel fluidly coupled the axial channel and external to the housing; and a cooling apparatus coupled to the motor, the cooling apparatus configured to pull air through the radial channel and the axial channel.

In various embodiments, the torque tube may comprise a plurality of radial apertures disposed proximate the cooling apparatus. The cooling apparatus may be configured to exhaust the air through the plurality of radial apertures. The controller surface may include a plurality of fins. The cooling apparatus may be an impeller. The cooling apparatus may be a direct current (DC) electrical fan. The motor may comprise a shaft defining a longitudinal axis, the cooling apparatus coupled to the shaft. The cooling apparatus may spin as the shaft spins. The cooling apparatus may be electrically coupled to the controller, the cooling apparatus configured to operate independently of the motor.

A method of cooling a motor and a controller of a hoist, in accordance with various embodiments, is disclosed herein. The method comprises: extending or retracting a cable coupled to a cable drum; spinning a cooling apparatus in response to the extending or retracting of the cable, the cooling apparatus disposed within a torque tube; pulling air, via the cooling apparatus, from external to a housing of the hoist through a radial channel defined by a housing surface of the housing and a controller surface of the controller; and pulling the air, via the cooling apparatus, from the radial channel through an axial channel defined by an outer surface of the motor and an inner surface of the torque tube.

In various embodiments, the method may further comprise exhausting the air radially out the torque tube through a plurality of radial apertures disposed proximate the cooling apparatus. The method may further comprise exhausting the air axially out the cable drum through an exhaust channel defined by a cable drum inner surface of the cable drum and a torque tube outer surface of the torque tube.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

This detailed description of exemplary embodiments references the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein described without departing from the scope and spirit hereof. Thus, this detailed description is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Cross hatching and surface lines may be used throughout the figures to denote different parts but not necessarily to denote the same or different materials.

A cooling system for a hoist is disclosed herein. The cooling system may be configured to actively cool an electric controller and an electric motor actively during operation. In accordance with various embodiments, the cooling system may include an electric fan or an impeller. A cooling system, as described herein, may utilize natural ducting in the gear train system. As such, the cooling system may be assembled with auxiliary ducting. The cooling system may pull air across an external surface of electronic controller and/or over the electric motor. The air may be exhausted through the torque tube and/or through the gearbox into the atmosphere.

Figure 1:
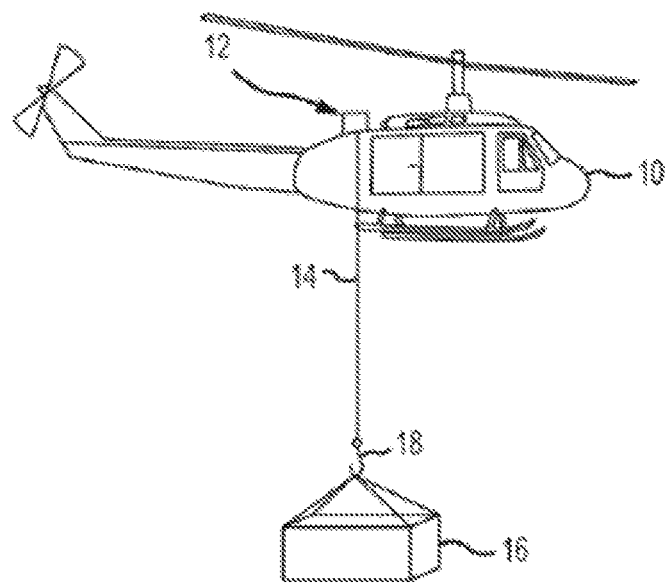
FIG. 1 illustrates an aircraft having a hoist, in accordance with various embodiments.

Referring now to FIG. 1, an aircraft 10, such as a helicopter, is illustrated, in accordance with various embodiments. Aircraft 10 may be used for search and rescue missions. A hoist 12 is attached to a support of aircraft 10. Hoist 12 may be used to extend and/or retract (e.g., lower and/or raise, respectively) a cable 14 (e.g., a wire-rope) connected to a load 16 via a hook 18 and/or the like.

Figure 2:
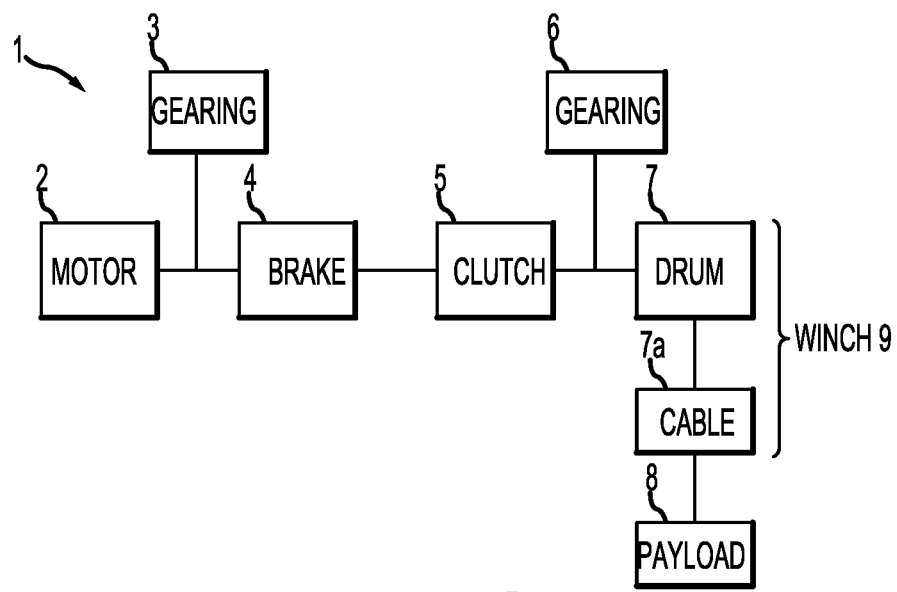
FIG. 2 illustrates a schematic block diagram of a hoist, in accordance with various embodiments.

Referring now also to FIG. 2, a schematic block diagram of a winch system 1 for a hoist 12 is illustrated, in accordance with various embodiments. A motor 2 is operatively connected to a brake 4 through gearing 3, which is operatively connected to the clutch 5, which is operatively connected to a drum 7 through gearing 6. The motor 2 is activated to provide drive to the drum 7 through the gearing 3, the brake 4, the clutch 5, and the gearing 6, to wind up (or release) a winch cable 7a to lift (or drop) a payload 8. The drum 7 and the winch cable 7a together form a winch 9. The brake 4 is provided to stop cable winding without disengaging the motor 2, whereas the clutch 5 acts as moderating the drive, allowing the drum 7 to be disconnected from the motor 2 should the drum 7 become overloaded.

Figure 3:
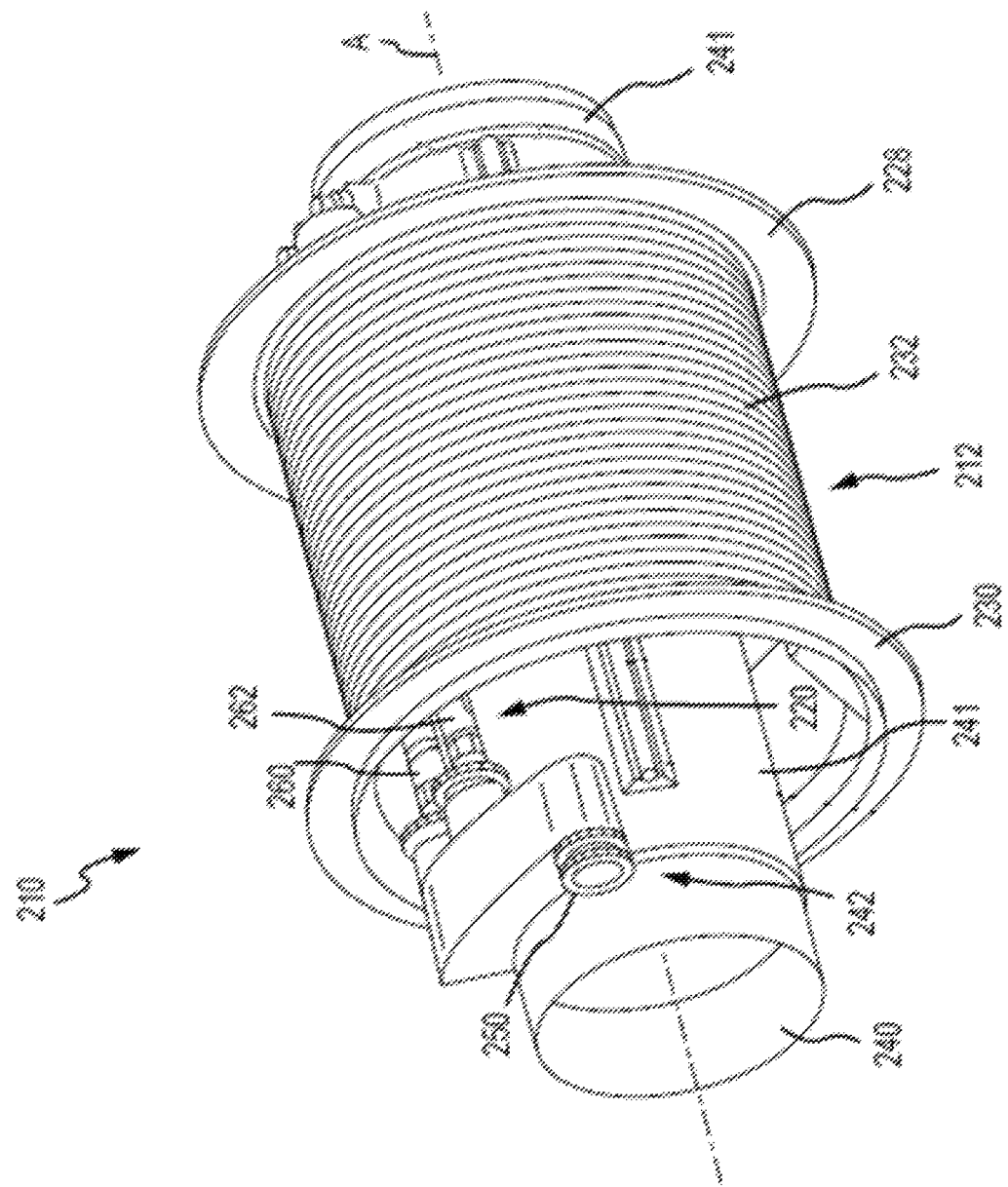
FIG. 3 illustrates a perspective view of a hoist, in accordance with various embodiments.

Referring now to FIG. 3, a perspective view of a rescue hoist, in accordance with various embodiments, is depicted. The rescue hoist 210 includes a cable drum 212, having a first radial flange 228, a second radial flange 230 and a barrel 232 extending axially between the first radial flange 228 and the second radial flange 230. In various embodiments, the cable drum 212 is disposed radially outward of a torque tube 240, within which a motor and a drive mechanism may be at least partially housed. In various embodiments, both the torque tube 240 and the cable drum 212 are configured to rotate about a longitudinal axis A. The cable drum 212 is also configured to translate back and forth with respect to the longitudinal axis A.

The rescue hoist 210 includes a speed reduction mechanism 242, which may, in various embodiments, include or be coupled to a planetary gear 250 configured to be driven by a ring gear disposed radially outward of the torque tube 240 and driven by a motor and a drive train. The speed reduction mechanism 242 may also be coupled to a level wind mechanism 220. In various embodiments, the level wind mechanism 220 includes a first screw 260 and a second screw 262, both screws extending axially along a radially outer surface 241 of the torque tube 240.

Figure 4:
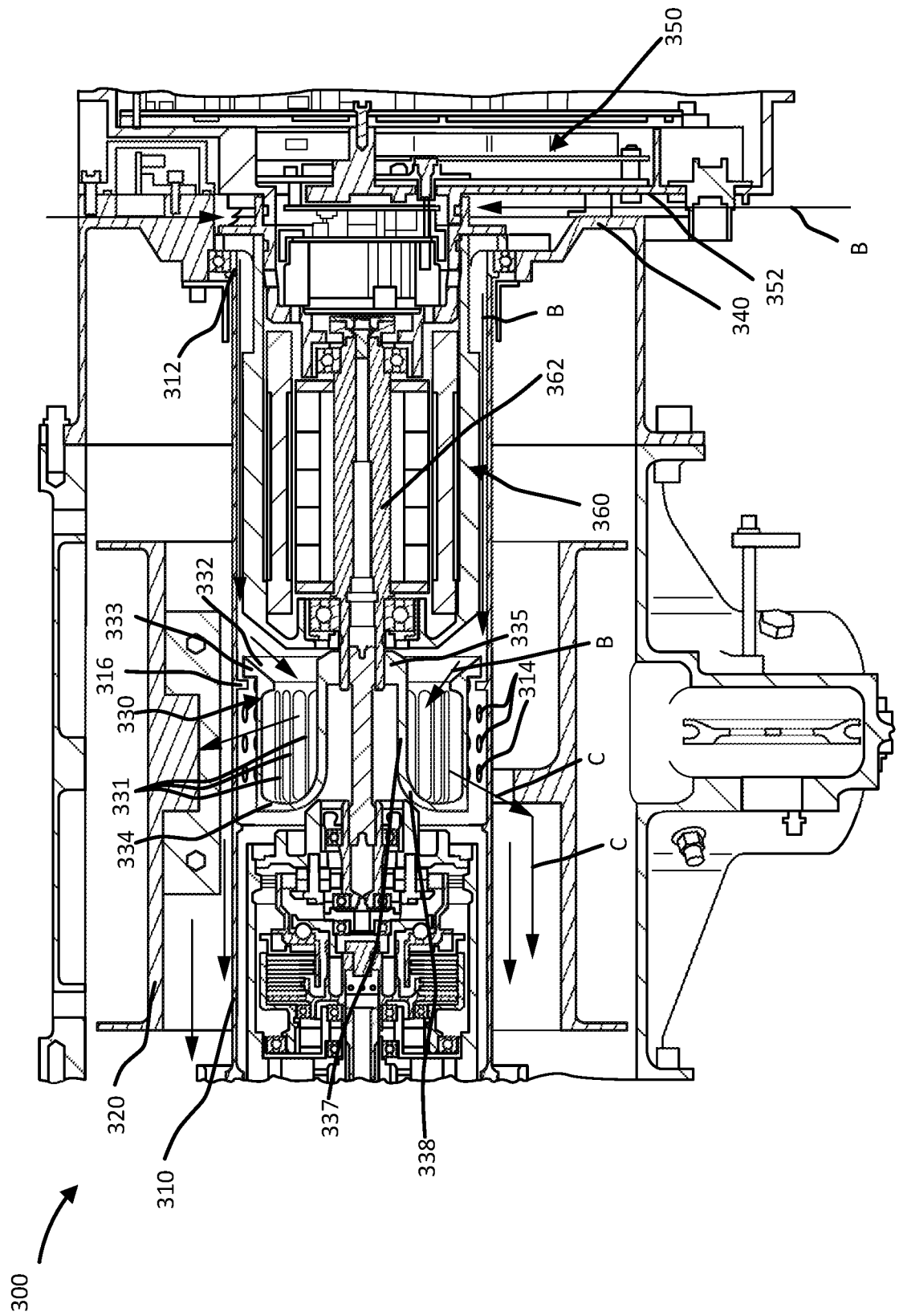
FIG. 4 illustrates a cross-section view of a hoist, in accordance with various embodiments.

Referring now to FIG. 4, a cross-sectional view of a hoist along longitudinal axis A, in accordance with various embodiments, is depicted. Hoist 300 includes torque tube 310, a cable drum 320, a housing 340, a controller 350, and a motor 360. In various embodiments, the motor 360 is coupled to a gear box, which outputs torque to torque tube 310 and drives the cable drum 320 and rotates cable drum 320 about its longitudinal axis. Torque tube 310 is coupled to cable drum 320 by any method known in the art. For example, torque tube 310 may be coupled to cable drum 320 at a first end 312 of torque tube 310 by a ball bearing assembly. The ball bearing assembly may reduce rotational friction between the torque tube 310 and the cable drum 320. In various embodiments, the controller 350 is coupled to the housing 340 at a first end of the housing 340. In various embodiments, motor 360 is coupled to controller 350 by any method known in the art. For example, motor 360 may be in electrical communication with controller 350. Additionally, motor 360 is electrically coupled to controller 350.

Figure 5:
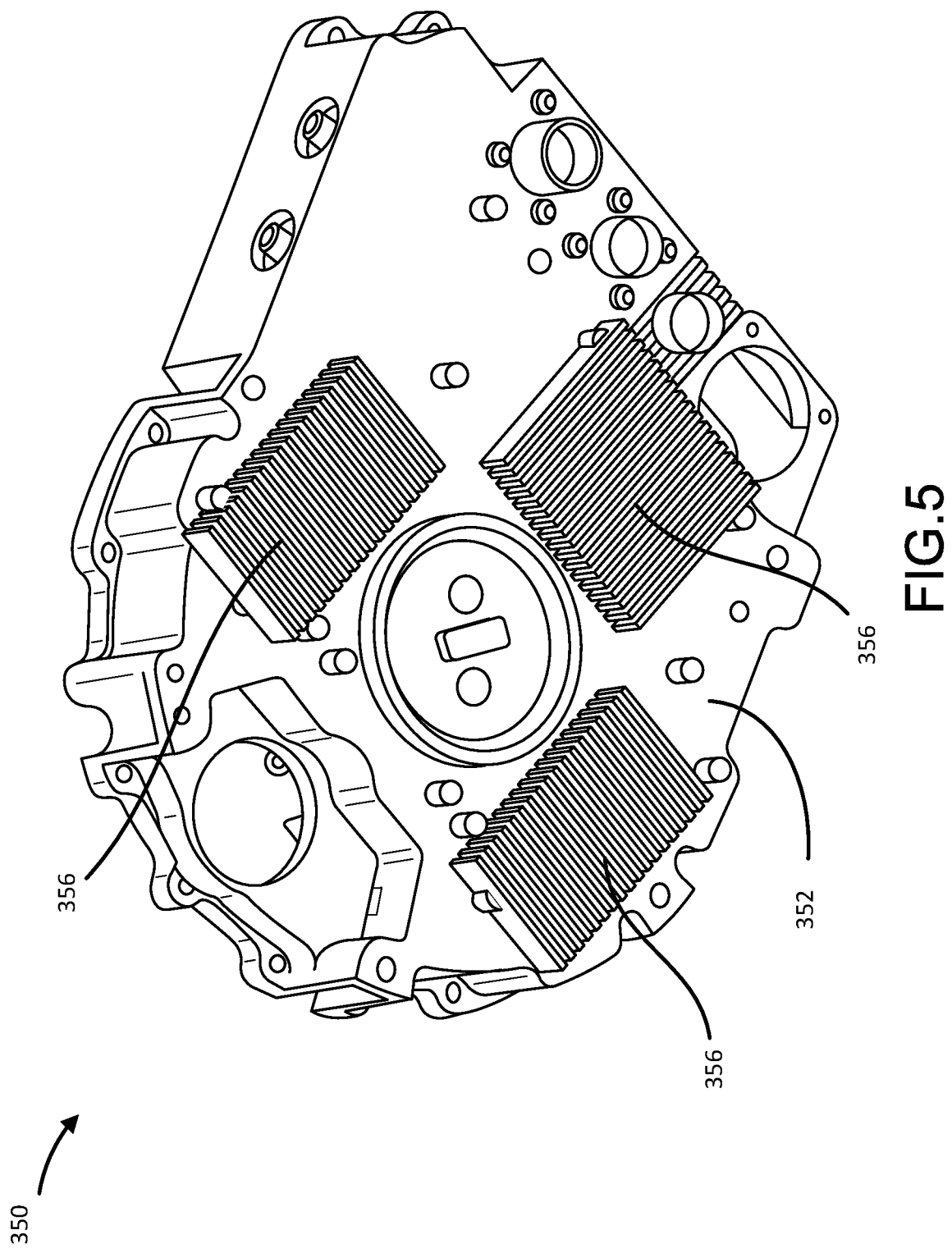
FIG. 5 illustrates a controller for a hoist, in accordance with various embodiments.

In various embodiments, controller 350 comprises a housing adjacent surface 352. With brief reference to FIG. 5, housing adjacent surface 352 includes a plurality of fins 356. In various embodiments, fins 356 are configured to conduct air that runs across the fins and cool the controller 350.

Referring back to FIG. 4, hoist 300 further comprises a cooling apparatus 330. Cooling apparatus 330 is disposed within torque tube 310 and configured to cool the hoist 300. In particular, cooling apparatus 330 may be configured to cool the motor 360 and/or the controller 350. In various embodiments, cooling apparatus 330 is an impeller. Cooling apparatus 330 may be coupled to shaft 362 by any method known in the art, such as a spline or a keyway. In various embodiments, cooling apparatus 330 is mechanically mounted to shaft 362. In various embodiments, the cooling apparatus 330 is configured to pull air from outside the housing 340 through past the fins 356 of housing adjacent surface 352 (with brief reference to FIG. 5), past the motor 360, through the torque tube 310, out the torque tube 310, through the cable drum 320, and out the housing 340. In various embodiments, the cooling apparatus 330 may pull airflow along airflow path B and exhaust airflow along airflow path C.

In various embodiments, housing 340 and controller 350 may define a radial channel extending from external to the housing 340 into the torque tube 310. In various embodiments, housing 340 and controller 350 may define multiple channels. Similarly, an external surface of motor 360 and an internal surface of torque tube 310 may define an axial channel extending from an end of the radial channel to the cooling apparatus 330.

In various embodiments, the cooling apparatus 330 comprises an inlet 332 disposed proximate the motor 360. The inlet 332 is disposed radially inward from a flange 333 disposed at a forward end of the cooling apparatus 330. In various embodiments, inlet 332 may be a frustoconical recess. The inlet 332 may be aligned in the axial direction of the hoist. Axial direction, as used herein refers to the longitudinal axis of the hoist. Aft of the inlet is an aft end 334 of the cooling apparatus 330. A plurality of blades 336 are disposed between the flange 333 and the aft end 334 of the cooling apparatus 330. The flange 333 extends radially outward from the plurality of blades at the first end of the cooling apparatus 330 and towards the torque tube 310. The cooling apparatus 330 comprises a plurality of outlets aligned in the radial direction. Each outlet is defined by a space between adjacent blades in the plurality of blades 336. Cooling apparatus 330 may further comprise a mounting portion 335 at the forward end of the cooling apparatus 330. The mounting portion 335 is disposed radially inward from inlet 332. Mounting portion 335 may comprise a spline or a keyway and be configured to mount directly to shaft 362 of motor 360. Cooling apparatus 330 may further comprise a radially inner portion 337 extending from mounting portion 335 to aft end 334. Radially inner portion 337 may be a solid portion of cooling apparatus 330 that is continuous circumferentially about longitudinal axis A. Cooling apparatus 330 may further comprise a convex portion 338 at aft end 334. Similar to the radially inner portion 337, convex portion 338 is a solid portion of cooling apparatus 330 that is continuous circumferentially about longitudinal axis A. Cooling apparatus 330 is configured to pull air in axially through inlet 332 and direct air out through each outlet defined by the plurality of blades 336.

The cooling apparatus 330 is configured to rotate about the longitudinal axis with the shaft 362 to draw air from forward of the inlet 332 into the cooling apparatus 330. As used herein, "forward" refers to the direction associated with front of the hoist, or generally, towards the controller 350. As used herein, "aft" refers to the direction associated with the rear of the hoist, or generally, the direction away from the controller 350. In various embodiments, the cooling apparatus 330 is configured to draw air from forward of the inlet 332 whether the cooling apparatus is spinning clockwise or counterclockwise about the longitudinal axis A. For example, when the cable drum 320 is spinning to lower a cable, the cooling apparatus is pulling air through the radial channel and axial channel. Similarly, when the cable drum 320 is spinning to pull up a cable, the cooling apparatus is pulling air through the radial channel and the axial channel. In various embodiments, the cooling air may be drawn from the atmosphere and/or external to the housing 340 through the radial channel and the axial channel and into the inlet 332 of the cooling apparatus 330.

In various embodiments, torque tube 310 comprises a plurality of radial apertures 314 disposed radially outward from cooling apparatus 330. The radial apertures 314 may be of any shape known in the art, such as circular, elongates, oval, racetrack shape, or the like. The radial apertures may be in fluid communication with an outlet of the cooling system defined by an outer radial surface of the torque tube 310 and an inner radial surface of the cable drum 320. The torque tube 310 may further comprise a shoulder 316 extending radially inward from a radially inner surface of the torque tube 310 and toward the cooling apparatus 330. The shoulder 316 may be disposed proximate the flange 333 of the cooling apparatus 330. The shoulder 316 and flange 333 configuration may prevent air circulating forward of the cooling apparatus 330 after entering the inlet 332 of the cooling apparatus.

Figure 6:
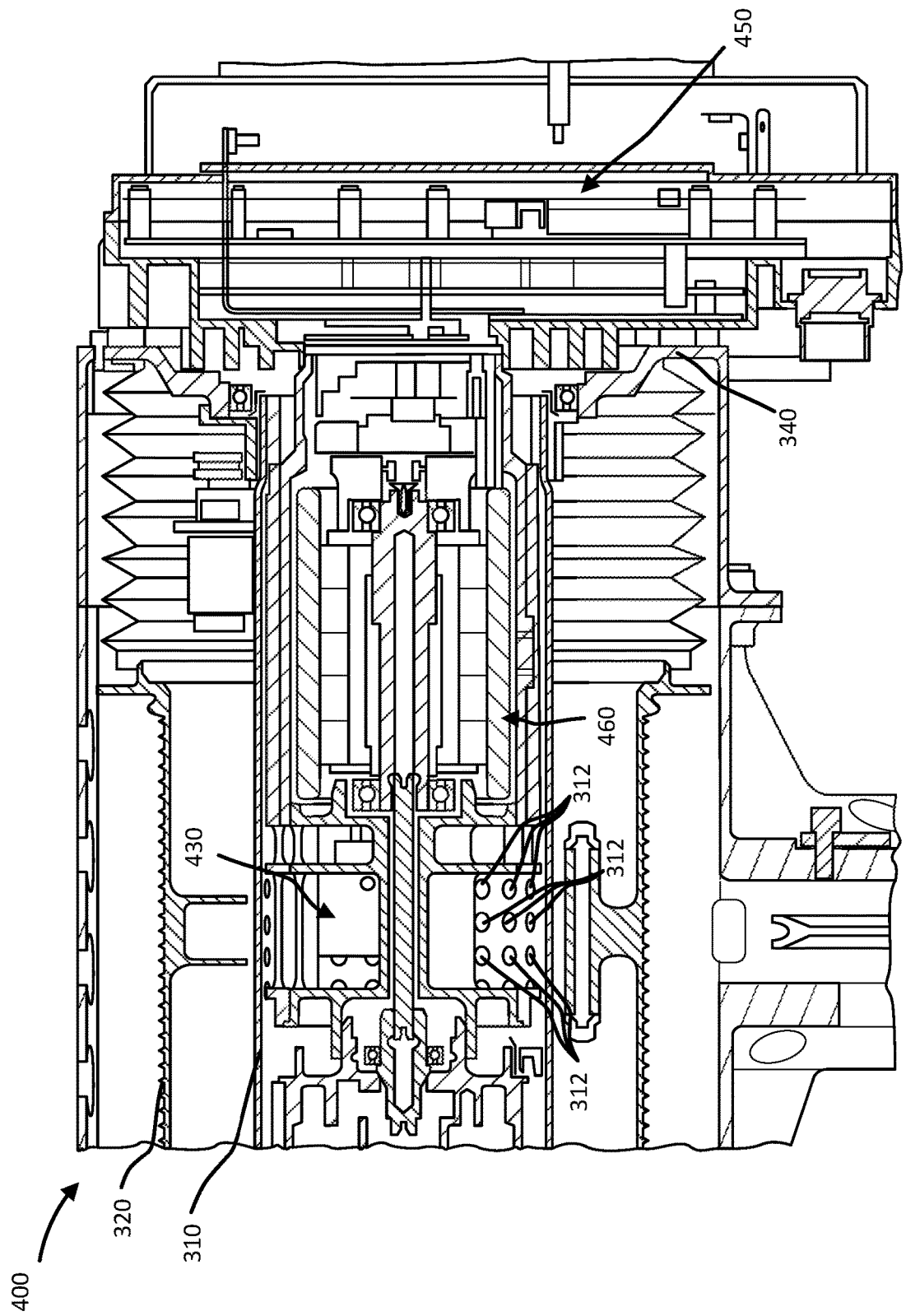
FIG. 6 illustrates a cross-section view of a hoist, in accordance with various embodiments.

Referring now to FIG. 6, a cross-sectional view of a hoist along longitudinal axis A, in accordance with various embodiments, is depicted. Hoist 400 includes torque tube 310, a cable drum 320, a housing 340, a controller 450, and a motor 460.

In various embodiments, hoist 400 further includes at least one cooling apparatus 430. In various embodiments, hoist 400 comprises a first cooling apparatus and a second cooling apparatus. Any number of cooling apparatus 430 is within the scope of this disclosure and may be determined based on the desired volume of air pulled through the system. Cooling apparatus 430 is coupled to motor 360 by any method known in the art. In various embodiments, cooling apparatus 430 is mechanically coupled to an aft end of motor 460. Cooling apparatus 430 comprises a fan. Cooling apparatus 430 may operate independently of the cable drum. For example, the fan may operate when cable drum 320 is stationary. In various embodiments, cooling apparatus 430 is electrically coupled to the controller 450 by any method known in the art. In various embodiments, torque tube 310, cable drum 320, and housing 340 may be as described above with respect to FIG. 3. In various embodiments, controller 450 may include elements from controller 350 and motor 460 may include elements from controller 350 and vice versa.

Figure 7:
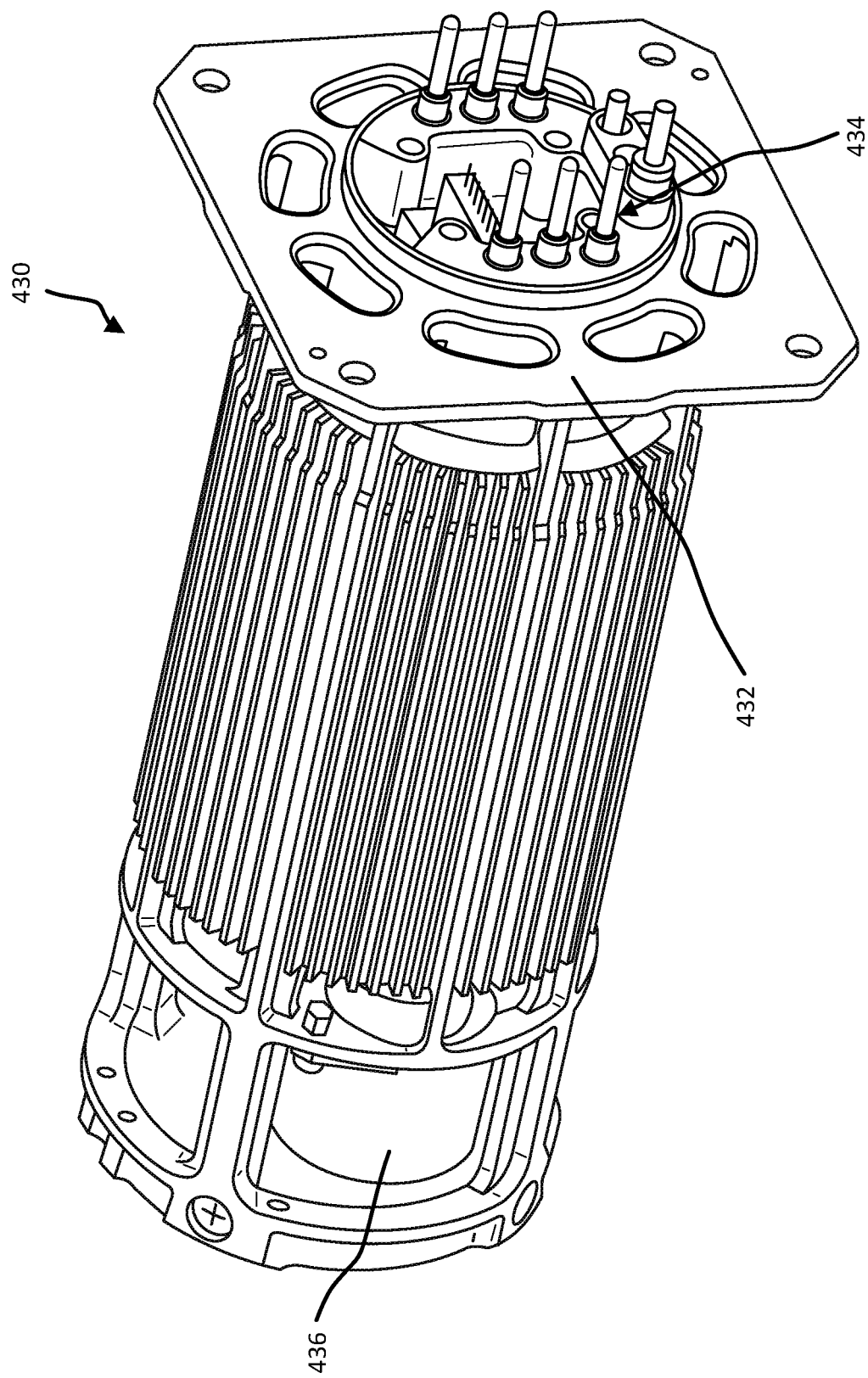
FIG. 7 illustrates a cooling apparatus, in accordance with various embodiments.

Referring now to FIG. 7, a cooling apparatus 430 in accordance with various embodiments, is depicted. In various embodiments, cooling apparatus 430 is a direct current (DC) electrical fan. Cooling apparatus 430 may comprises a mounting flange 432, electrical connectors 434, and a fan 436. In various embodiments, with reference to FIGS. 5 and 6, mounting flange 432 may be mounted to an aft end of motor 460. Electrical connectors 434 may be electrically coupled to the controller 450 through the motor 460. In various embodiments, the controller 450 may provide a signal to cooling apparatus 430. Upon receiving a signal from controller 450, the fan 436 may spin about the cooling apparatus longitudinal axis. Similar to cooling apparatus 330, fan 436 may pull air from external to the housing 340 through a radial channel defined by the controller 450 and the housing 340, through an axial channel defined by an outer surface of the motor 460 and an inner surface of the torque tube 310, and out the plurality of radial apertures 314 of torque tube 310.

Figure 8:
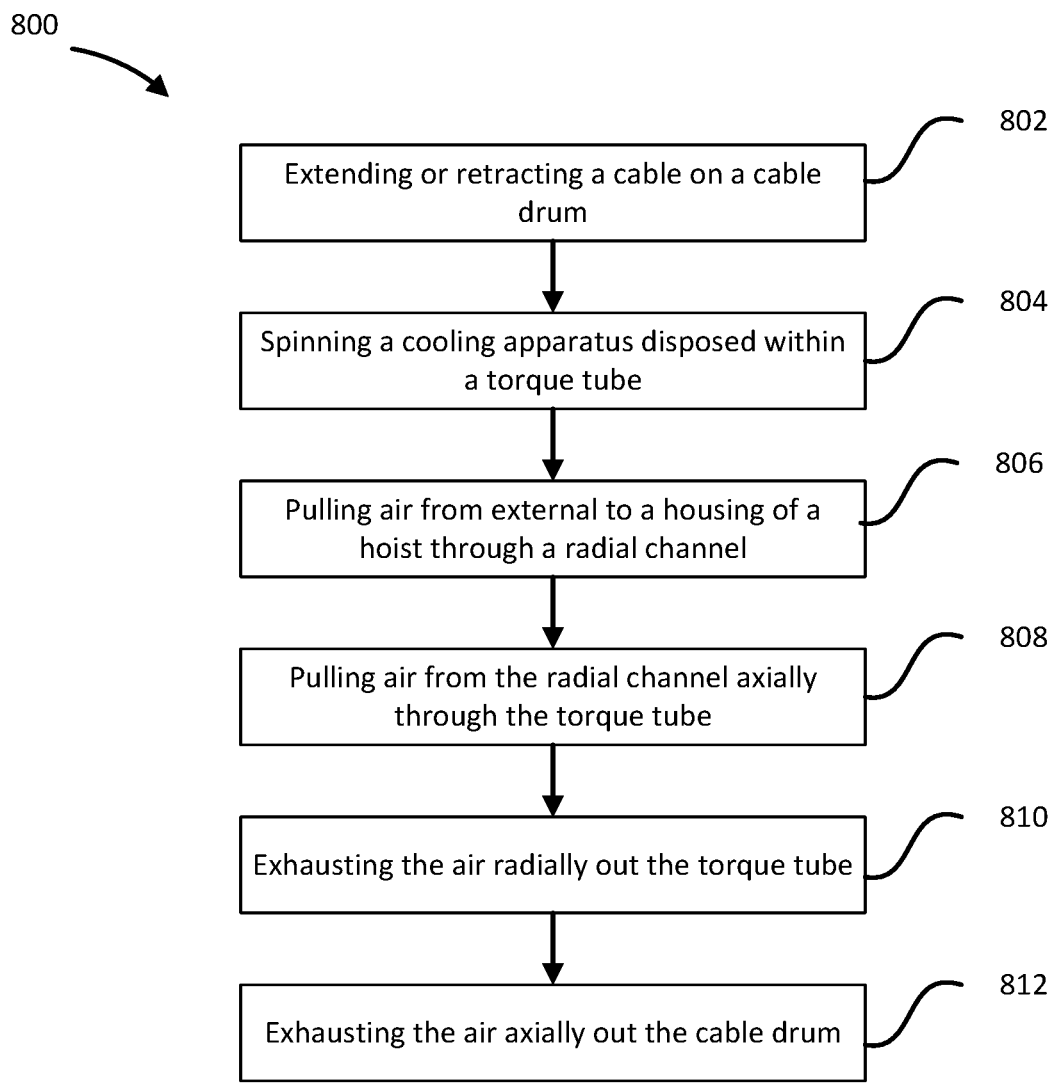
FIG. 8 illustrates a method of cooling a motor and a controller of a hoist, in accordance with various embodiments.

Referring now to FIG. 8, a method of cooling a motor and controller of a hoist, in accordance with various embodiments is depicted. The method 800 comprises extending or retracting a cable on a cable drum of the hoist (step 802). By extending or retracting the cable drum of the hoist, an electric motor will rotate a shaft about a longitudinal axis of the hoist. The shaft of the motor provides drive to the drum through gearing allowing it to rotate about the longitudinal axis. The method further comprises spinning a cooling apparatus (step 804). In various embodiments, the cooling apparatus may spin automatically as the cable drum spins. In various embodiments, the cooling apparatus may spin independently of the cable drum. The method further comprises pulling air from external to a housing of the hoist through a radial channel and internal to the hoist (step 806). In various embodiments, the radial channel may be defined by the housing and a housing adjacent surface of a controller. The housing adjacent surface may comprise fins configured to conduct heat and cool internal components of the controller as air passes by the fins.

The method further comprises pulling air from the radial channel axially through an axial channel defined by an inner surface of torque tube and an outer surface of the motor (step 808). In various embodiments, the airflow passing by the motor may cool the motor. The method further comprises exhausting the air radially out the torque tube (step 810). The torque tube may comprise a plurality of radial apertures proximate an outlet of the cooling apparatus. The cooling air may be directed out the plurality of radial apertures and be exhausted out the cable drum through a channel defined by an outer surface of the torque tube and an inner surface of the cable drum (step 812).

In various embodiments, the method of cooling the controller and motor of the hoist may provide more efficient cooling to the controller and the motor by allowing the air to flow over the controller first and then the motor. In various embodiments, a motor may become hotter during operation than a controller. As such, it may be advantageous to cool the controller first and the motor second during operation, so the air is not heated up as much when cooling the controller first as opposed to cooling the motor first.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A hoist comprising:
    a housing;
    a torque tube disposed within the housing, the torque tube having a plurality of radial apertures, each radial aperture in the plurality of radial apertures extending radially from an inner surface of the torque tube to an outer surface of the torque tube;
    a drum disposed radially outward from the torque tube;
    a motor disposed within the torque tube, the motor having a shaft defining a longitudinal axis;
    a controller coupled to the motor and the housing proximate a housing adjacent surface of the controller; and
    a cooling apparatus disposed within the torque tube and coupled to the shaft of the motor proximate the plurality of radial apertures of the torque tube, the cooling apparatus configured to pull air from outside the housing radially inward past the controller, axially through the torque tube, radially out the plurality of radial apertures, and axially out a channel defined between the torque tube and the drum.

2. The hoist of claim 1, wherein the cooling apparatus comprises a mounting portion coupled to the shaft of the motor.

3. The hoist of claim 2, wherein the cooling apparatus comprises a first end defining an inlet and a second end disposed opposite the first end.

4. The hoist of claim 3, wherein the cooling apparatus comprises a plurality of blades disposed between the first end and the second end.

5. The hoist of claim 1, wherein the controller comprises a plurality of fins disposed on the housing adjacent surface.

6. The hoist of claim 1, wherein the cooling apparatus is an impeller.

7. The hoist of claim 1, wherein the cooling apparatus is a direct current (DC) electrical fan.

8. The hoist of claim 1, wherein the cooling apparatus rotates as the shaft of the motor rotates.

9. A hoist comprising:
    a housing having a first end partially defining a housing surface;
    a torque tube disposed within the housing, the torque tube having a torque tube inner surface and a torque tube outer surface;
    a motor disposed within the torque tube, the motor having a motor outer surface, the torque tube inner surface and the motor outer surface defining an axial channel, the motor having a shaft;
    a controller having a controller surface, the controller coupled to the motor and the housing proximate the housing surface, the housing surface and the controller surface defining a radial channel fluidly coupled the axial channel and external to the housing; and
    a cooling apparatus disposed within the torque tube and coupled to the shaft of the motor, the shaft defining a longitudinal axis, the cooling apparatus configured spin about the longitudinal axis and to pull air through the radial channel and the axial channel.

10. The hoist of claim 9, wherein the torque tube comprises a plurality of radial apertures disposed proximate the cooling apparatus.

11. The hoist of claim 10, wherein the cooling apparatus is configured to exhaust the air through the plurality of radial apertures.

12. The hoist of claim 9, wherein the controller surface includes a plurality of fins.

13. The hoist of claim 9, wherein the cooling apparatus is an impeller.

14. The hoist of claim 9, wherein the cooling apparatus is a direct current (DC) electrical fan.

15. The hoist of claim 9, wherein the cooling apparatus spins as the shaft spins.

16. The hoist of claim 9, wherein the cooling apparatus is electrically coupled to the controller, the cooling apparatus configured to operate independently of the motor.

17. A method of cooling a motor and a controller of a hoist, the method comprising:
- extending or retracting a cable coupled to a cable drum;
- spinning a cooling apparatus in response to the extending or retracting of the cable, the cooling apparatus disposed within a torque tube;
- pulling air, via the cooling apparatus, from external to a housing of the hoist through a radial channel defined by a housing surface of the housing and a controller surface of the controller;
- pulling the air, via the cooling apparatus, from the radial channel through an axial channel defined by an outer surface of the motor and an inner surface of the torque tube; and
- exhausting the air radially out the torque tube through a plurality of radial apertures disposed proximate the cooling apparatus, each radial aperture in the plurality of radial apertures extending from a radially inner surface of the torque tube to a radially outer surface of the torque tube.

18. The method of claim 17, further comprising exhausting the air axially out the cable drum through an exhaust channel defined by a cable drum inner surface of the cable drum and a torque tube outer surface of the torque tube.

* * * * *